United States Patent [19]
Feintuch et al.

[11] 3,787,838
[45] Jan. 22, 1974

[54] FAIL SAFE BUILT-IN TEST EQUIPMENT

[75] Inventors: Martin W. Feintuch, Baramus; Allen S. Silver, Oakland, both of N.J.

[73] Assignee: The Bendix Corportion, Teterboro, N.J.

[22] Filed: June 29, 1972

[21] Appl. No.: 267,285

[52] U.S. Cl. ............................ 340/409, 340/248 A
[51] Int. Cl. ........................................... G08b 21/00
[58] Field of Search.... 340/248 A, 409; 235/92 CA, 235/92 CC, 92 EC

[56] References Cited
UNITED STATES PATENTS

| | | | |
|---|---|---|---|
| 3,383,672 | 5/1968 | Clarridge | 340/248 A |
| 3,671,953 | 6/1972 | Goldberg | 340/409 X |
| 3,708,791 | 1/1973 | Curran et al. | 340/248 A |

*Primary Examiner*—Donald J. Yusko
*Assistant Examiner*—Daniel Myer
*Attorney, Agent, or Firm*—Anthony F. Cuoco et al.

[57] ABSTRACT

Built-in test equipment (BITE) for an electronic system is implemented in a fail safe manner, with the test equipment itself not having failure modes which might inhibit detection of a system failure. The equipment insures detection of any single system failure and is in a "No-Go" condition if any tests in a test sequence are skipped.

6 Claims, 1 Drawing Figure

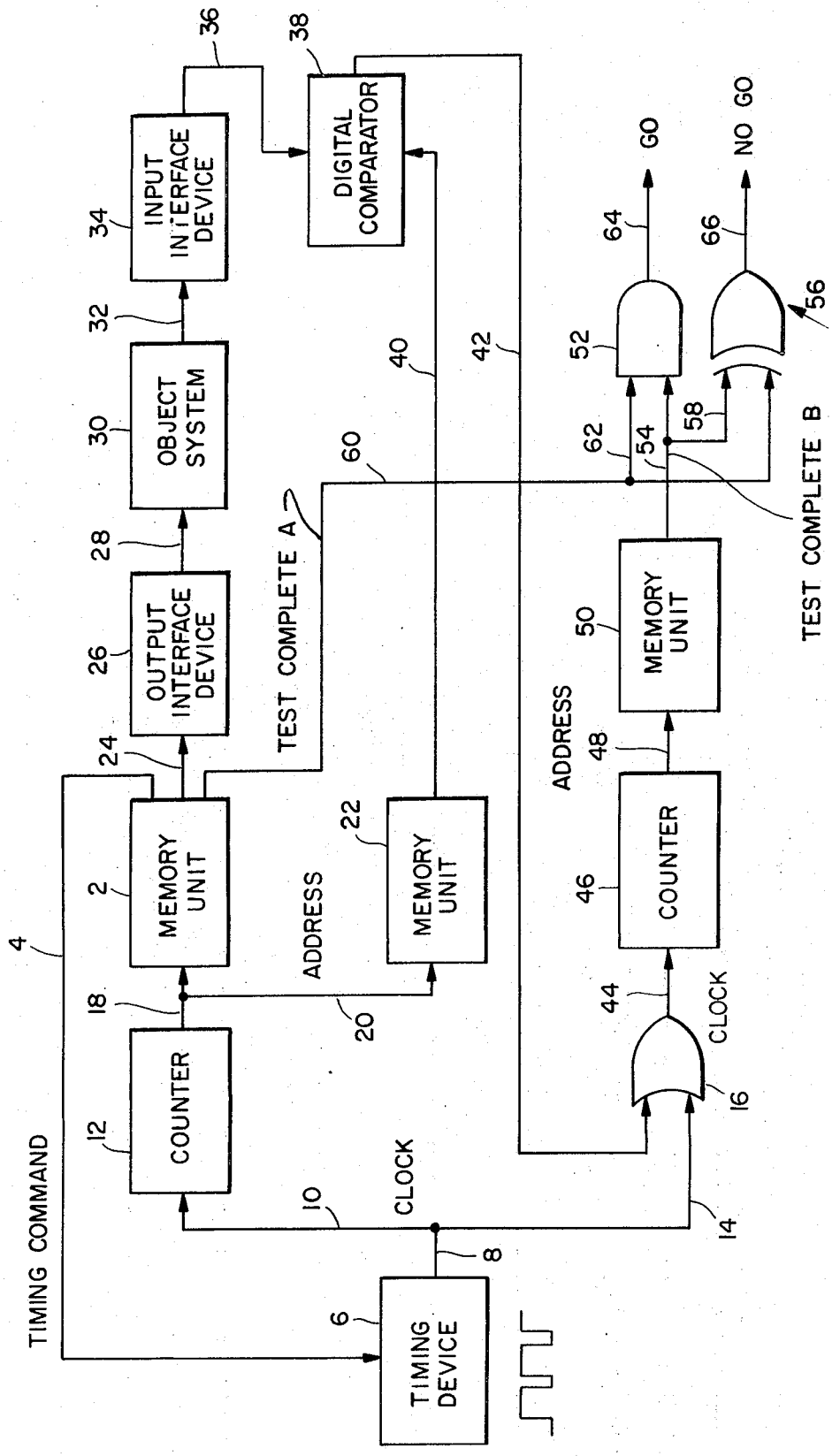

FAIL SAFE BUILT-IN TEST EQUIPMENT

BACKGROUND OF THE INVENTION

1. Field of the Invention

This invention relates to electronic systems including built-in test equipment. More particularly, the invention relates to systems of the type described wherein the test equipment operates in a fail safe manner.

2. Description of the Prior Art

Aircraft control systems and the like require automatic self-testing capability to insure performance of required functions. It is necessary that the equipment performing the test does not itself possess failure modes that might inhibit the detection of an actual system failure. Prior to the present invention, test equipment failures, have occurred which could cause a test to be skipped or a valid output to be provided, whether or not a system failure occurred.

SUMMARY OF THE INVENTION

This invention comtemplates equipment of the type described and including a timing device connected to a first counter which drives first and second memory units and connected through a gate to a second counter which drives a third memory unit. The first memory unit commands the timing device to provide pulses and activates an output interface device. The output interface device applies test signals to the system to be tested (object system) which responds by driving an input interface device to provide signals at discrete levels. These signals are applied to a digital comparator and compared thereby with signals from the second memory unit. Any difference between the compared signals forces the output of the digital comparator to a "true" state, and which output is applied through the gate to the second counter. When the pulses from the timing device are at a predetermined pulse width, the first counter will advance to the next count, but the second counter will so advance only if the output from the digital comparator is at a "false" state. In this fashion, the first counter counts the number of pulses provided by the timing device, which corresponds to the number of test steps, and the second counter counts the pulses provided only if no difference is detected between commanded and actual object system response. When the first counter has counted a predetermined number of pulses the first memory unit provides a "test complete" signal and inhibits the timing device from providing additional pulses. When a predetermined number of successful test steps have been counted the third memory unit provides another "test complete" signal. A "GO" condition exists if both "test complete" signals are present and a "NO GO" condition exists if only one of said signals is present.

One object of this invention is to provide built-in test equipment for an electrical system, and which test equipment is implemented in a fail safe manner.

Another object of this invention is to provide built-in test equipment for an electrical system, and wherein the test equipment itself does not possess failure modes that might inhibit detection of an actual system failure.

Another object of this invention is to eliminate the condition where failure to the test equipment causes certain tests to be skipped or causes a valid system output regardless of test results.

Another object of this invention is to provide equipment of the type described which insures the detection of any single system failure.

Another object of this invention is to provide equipment of the type described wherein a "NO GO" condition exists if any tests in a test sequence are skipped.

The foregoing and other objects and advantages of the invention will appear more fully hereinafter from a consideration of the destailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is a block diagram of apparatus constructed according to the invention.

DESCRIPTION OF THE INVENTION

A memory unit 2 is connected through a conductor 4 to a timing device 6. Timing device 6 is connected through a conductor 8 and a conductor 10 to a counter 12 and through conductor 8 and a conductor 14 to a gate 16. Counter 12 is connected through a conductor 18 to memory unit 2 and through conductor 18 and a conductor 20 to a memory unit 22.

Memory unit 2 is connected through a conductor 24 to an output interface device 26. Output interface device 26 is connected through a conductor 28 to the object system i.e. the system to be tested, 30. Object system 30 is connected through a conductor 32 to an input interface device 34. Input interface device 34 is connected through a conductor 36 to a digital comparator 38. Memory unit 22 is connected through a conductor 40 to digital comparator 38.

Digital comparator 38 is connected through a conductor 42 to gate 16. Gate 16 is connected through a conductor 44 to a counter 46. Counter 46 is connected through a conductor 48 to a memory unit 50. Memory unit 50 is connected to a gate 52 through a conductor 54 and to a gate 56 through conductor 54 and a conductor 58. Memory unit 2 is connected to gate 56 through a conductor 60 and is connected to gate 52 through conductor 60 and a conductor 62. A "GO" condition is provided at an output conductor 64 connected to gate 52 and a "NO-GO" condition is provided at an output conductor 66 connected to gate 56.

The several components of the invention shown in the figure are standard components well known in the art. The novelty of the invention resides in the arrangement of the components and not in the component themselves.

In this connection reference is made to the textbook *Pulse Digital and Switching Waveforms*, by Millman and Taub, published by McGraw Hill Book Company, 1965. Counters 12 and 46 may be of the type described at page 660, in figure 18–1, output interface device 26 may be a digital to analog converter of the type described at page 675, in figure 18–4 and input interface device 34 may be an analog to digital converter also described at page 675 and shown in figure 18–4. Memory units 2, 22 and 50 may be conventional read only memory (ROM) devices of the type described in section 17–7, page 617 of the textbook, *Integrated Electronics Analog to Digital Circuits and Systems* by Millman and Halkias, published by McGraw Hill Book Company in 1972. Digital comparator 38 may be an exclusive OR gate as is well known in the art.

Thus, timing device 6 provides pulses in accordance with a command from memory unit 2. Counters 12 and 46 are arranged to provide a zero count when power is applied to the system and to advance one count for each pulse received from timing device 6. Memory units, 2, 22, and 50 are arranged to provide logic signals at their output conductors as a function of the address appearing at their input conductors.

Output interface device 26 is arranged for translating or conditioning low power output signals from memory unit 2 to those signals necessary to interrogate object system 30. Input interface 34 device translates analog signals and high power discrete signals to low power discrete signals. Digital comparator 38 compares pairs of input signals and sets its output line to a "true" state if, and only if, a discrepancy appears in any of the pairs of input signals.

OPERATION OF THE INVENTION

Memory unit 2 applies a timing command to timing device 6 and activates output interface device 26. Output interface device 26 applies test signals to object system 30 in accordance with the inputs from memory unit 2.

Memory unit 22 applies signals to digital comparator 38. Object system 30 responds to stimuli from output interface device 26 and forces the outputs of various analog to digital counters in input device 34 to discrete level signals. The discrete level signals from input interface device 34 are applied to digital comparator 38 and compared thereby to the signals from memory unit 22. Any discrepancy in the signals will force the output of the digital comparator to the "true" state.

When the pulses from timing device 6 have attained a predetermined pulse width, a falling edge of the pulses is applied to counter 12 and to gate 16. Counter 12 will thereupon advance to the next count. The output from digital comparator 38 is applied through gate 16 which will provide a signal to advance counter 46 to the next count only if the output from the digital comparator is at a "false" state.

Thus, counter 12 counts the number of pulses provided by timing device 6, and which number of pulses corresponds to the number of test steps in a test sequence. Counter 46 counts the number of pulses provided by timing device 6 only if no difference is detected between the commanded and actual response of object system 30.

When counter 12 has counted a predetermined number of pulses, a "test complete A" signal is generated at the output of memory unit 2 and timing device 6 is commanded to emit a pulse of infinite width. In other words, the timing device is prevented from emitting more pulses.

Similarly counter 46 causes memory unit 50 to generate a "test complete B" signal when the specified number of successful test steps are counted. A "Go" condition is provided at the output of gate 64 if "test complete A" and "test complete B" signals occur simultaneously. If only one "test complete" signal is present without the other, then a "No Go" indication is provided at the output of gate 66.

It will now be understood that a memory independent of that used to generate input signals to the system is used to generate the comparison signals. This insures the detection of any signal failure in the circuitry located electrically between counter 12 and digital comparator 38.

Since counter 12 is independent of counter 46, any failure that causes either of the counters to skip tests will cause one of the two counter channels to reach "test complete" status before the other thereby assuring a "NO-GO" situation.

A failure in digital comparator 38 is readily detectable by arranging memory unit 2 so that a known number of tests are not passed. If a test is erroneously passed, then the "test complete B" signal occurs prior to "test complete A" signal and a "NO-GO" condition results. If timing device 6 fails, then either "test complete A" or "test complete B" signals occur and a "NO-GO" condition also results.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus including a system and built-in equipment for testing the system, comprising:
    a timing device for providing clock pulses;
    a first counter connected to the timing device and driven by the clock pulses therefrom;
    first and second memory units connected to the first counter and driven thereby for providing first and second outputs;
    a first interface device connected to the first memory unit and affected by the first output for providing test signals;
    a second interface device;
    the system connected to the first and second interface devices and responsive to the test signals from the first interface device for driving the second interface device to provide an output at a discrete level;
    a comparator connected to the second memory unit and to the second interface device for comparing the second output and the output at a discrete level, and for providing an output in one state when the compared outputs differ and an output in another state when said outputs correspond;
    a second counter;
    gating means connecting the second counter, to the timing device and to the comparator;
    the first counter driven by the clock pulses from the timing device to the next succeeding count for counting the number of pulses from the timing device which correspond to the number of test steps in a test sequence;
    the second counter driven by the gating means to the next succeeding count only if the output from the comparator is at the other state for counting the number of successful test steps completed;
    the first memory unit driven by the first counter to provide a first signal when a predetermined count is reached.
    a third memory unit driven by the second counter to provide a second signal when the predetermined count is reached; and means connected to the first and third memory units for providing a "GO" condition when the first and second signals are both present; and a "NO-GO" condition when only one of said signals is present.

2. Apparatus including a system and built-in equipment for testing the system, comprising:

means for providing pulses;

means for counting said pulses and for providing a first signal when a predetermined number of pulses is counted, said count corresponding to the number of steps in a test sequence;

means connected to the counting means and affected thereby when said means is counting the pulses for applying test signals to the system;

means connected to the system and responsive thereto when the test signals are applied for providing outputs at discrete levels;

means connected to the counting means for providing outputs in accordance with the number of pulses counted thereby;

a comparator connected to the discrete output means and to the last mentioned means for comparing the outputs therefrom and for providing a first output when the compared outputs differ and a second output when said outputs correspond;

means connected to the pulse providing means and to the comparator for providing a second signal only if the comparator provides the second output and the predetermined number of pulses are provided; and means connected to the means for counting the pulses and to the last mentioned means for providing a "GO" signal when both the first and second signals are provided and a "NO-GO" signal when only one of said signals is provided.

3. Apparatus as described by claim 2, wherein the means for counting said pulses and for providing a first signal when a predetermined number of pulses is counted, said count corresponding to the number of steps in a test sequence includes:

a counter connected to the pulse providing means for counting the pulses therefrom; and a memory unit connected to the counter for providing the first signal when the predetermined number of pulses is counted.

4. Apparatus as described by claim 3, wherein:

the memory unit is connected to the pulse providing means for controlling the pulses provided thereby.

5. Apparatus as described by claim 4, wherein the means connected to the pulse providing means and to the comparator for providing a second signal only if the comparator provides the second output and the predetermined number of pulses are provided includes:

a gate, connected to the pulse providing means and to the comparator for passing the pulses from said means when the comparator provides the second output;

a counter connected to the gate for counting the pulses passed thereby; and a memory unit for providing the second signal when the predetermined number of pulses are counted by the counter.

6. Apparatus as described by claim 1, wherein:

the first memory unit is connected to the timing device for controlling the pulses therefrom.

* * * * *